US009704354B2

(12) United States Patent
Cho

(10) Patent No.: US 9,704,354 B2
(45) Date of Patent: Jul. 11, 2017

(54) MEDIUM HANDLING APPARATUS AND METHOD, FINANCIAL DEVICE

(71) Applicant: LG CNS CO., LTD., Seoul (KR)

(72) Inventor: Han Cheol Cho, Seoul (KR)

(73) Assignee: LG CNS CO., LTD., Seoul (KR)

( * ) Notice: Subject to any disclaimer, the term of this patent is extended or adjusted under 35 U.S.C. 154(b) by 0 days.

(21) Appl. No.: 13/934,414

(22) Filed: Jul. 3, 2013

(65) Prior Publication Data

US 2014/0012413 A1 Jan. 9, 2014

(30) Foreign Application Priority Data

Jul. 3, 2012 (KR) ........................ 10-2012-0072173

(51) Int. Cl.
*G06K 7/00* (2006.01)
*G07F 19/00* (2006.01)

(52) U.S. Cl.
CPC ........... *G07F 19/202* (2013.01); *Y10S 902/12* (2013.01)

(58) Field of Classification Search
USPC .................. 235/375, 379, 380; 705/3, 35–45
See application file for complete search history.

(56) References Cited

U.S. PATENT DOCUMENTS 6,000,555 A * 12/1999 Anma ................ G07D 11/0081 209/534
6,338,048 B1 * 1/2002 Mori ...................... G06Q 20/00 705/41
2002/0153415 A1 * 10/2002 Minami et al. ............... 235/380
2008/0116257 A1 * 5/2008 Fickling ............... G06Q 20/042 235/379
2009/0148025 A1 * 6/2009 Calman ................ G06Q 20/042 382/135

FOREIGN PATENT DOCUMENTS

| | | | |
|---|---|---|---|
| CN | 1636222 | A | 7/2005 |
| CN | 101425194 | A | 5/2009 |
| CN | 201348798 | Y | 11/2009 |
| CN | 101635069 | A | 1/2010 |
| JP | H07192161 | A | 7/1995 |
| JP | 11-045365 | A | 2/1999 |
| KR | 10-2011-0023854 | A | 3/2011 |

OTHER PUBLICATIONS

Office Action dated Jul. 31, 2013 in Korean Application No. 10-2012-0072173, filed Jul. 3, 2012.
Office Action dated Mar. 23, 2015 in Chinese Application No. 201310274582.8.

* cited by examiner

*Primary Examiner* — Matthew Mikels
(74) *Attorney, Agent, or Firm* — Saliwanchik, Lloyd & Eisenschenk

(57) ABSTRACT

Provided are medium handling apparatus and method. The medium handling apparatus comprises an identification number recognition module recognizing an identification number of a medium, a memory in which a condition with respect to a management target medium is stored, and a controller determining whether the identification number of the medium recognized by the identification number recognition module satisfies the condition with respect to the management target medium stored in the memory to determine whether the medium is the management target medium.

10 Claims, 5 Drawing Sheets

MEDIUM HANDLING APPARATUS AND METHOD, FINANCIAL DEVICE

CROSS-REFERENCE TO RELATED APPLICATION

This application claims the benefit under 35 U.S.C. §119 of Korean Patent Application No. 10-2012-0072173, filed Jul. 3, 2012, which is hereby incorporated by reference in its entirety.

BACKGROUND

The present disclosure relates to a medium handling apparatus and method and a financial device.

In general, financial devices are devices for automatically handling financial business desired by customers. The financial devices may deposit or withdraw media (for example, paper moneys, checks, securities, gift certificates, and the like) or automatically transfer the media.

Such a financial device comprises a medium depositing and withdrawing device for depositing or withdrawing a medium and a medium storage box. The medium may be deposited through the medium depositing and withdrawing device and then stored in the medium storage box, and the medium stored in the medium storage box may be withdrawn through the medium depositing and withdrawing device.

In the case where the customer's financial business is automatically handed, a management target medium may be deposited by the customer. Thus, a device for distinguishing the management target medium by using an image sensor, a magneto-resistive sensor, or the like has been provided in the financial device according to the related art. However, as printing technologies are developed in recent years, it may be difficult to distinguish the management target medium through naked eye or the sensors.

BRIEF SUMMARY

Embodiments provide a medium handling apparatus and method and a financial device.

In one embodiment, a medium handling apparatus comprises: an identification number recognition module recognizing an identification number of a medium; a memory in which a condition with respect to a management target medium is stored; and a controller determining whether the identification number of the medium recognized by the identification number recognition module satisfies the condition with respect to the management target medium stored in the memory to determine whether the medium is the management target medium.

In another embodiment, a medium handling method comprises: recognizing an identification number of a medium by an identification number recognition module; determining, by a controller, whether the recognized identification number of the medium satisfies a condition with respect to an identification number of a management target medium; and storing information with respect to the identification number of the medium that is determined as the identification number satisfies the condition with respect to the identification number of the management target medium into a memory.

In further another embodiment, a financial device comprises: a medium depositing and withdrawing part through which a medium is deposited or withdrawn; a medium handling apparatus for determining whether the medium is the management target medium; a reject box for storing a medium that is determined as a management target medium in the medium handling apparatus; and a medium storage box for storing a medium that is determined as a normal medium in the medium handling apparatus, wherein the medium handling apparatus compares an identification number of the medium to information with respect to the management target medium stored in a memory to determine whether the medium is the management target medium in real-time during financial transaction or after the financial transaction is finished.

The details of one or more embodiments are set forth in the accompanying drawings and the description below. Other features will be apparent from the description and drawings, and from the claims.

DETAILED DESCRIPTION

Figure 1:
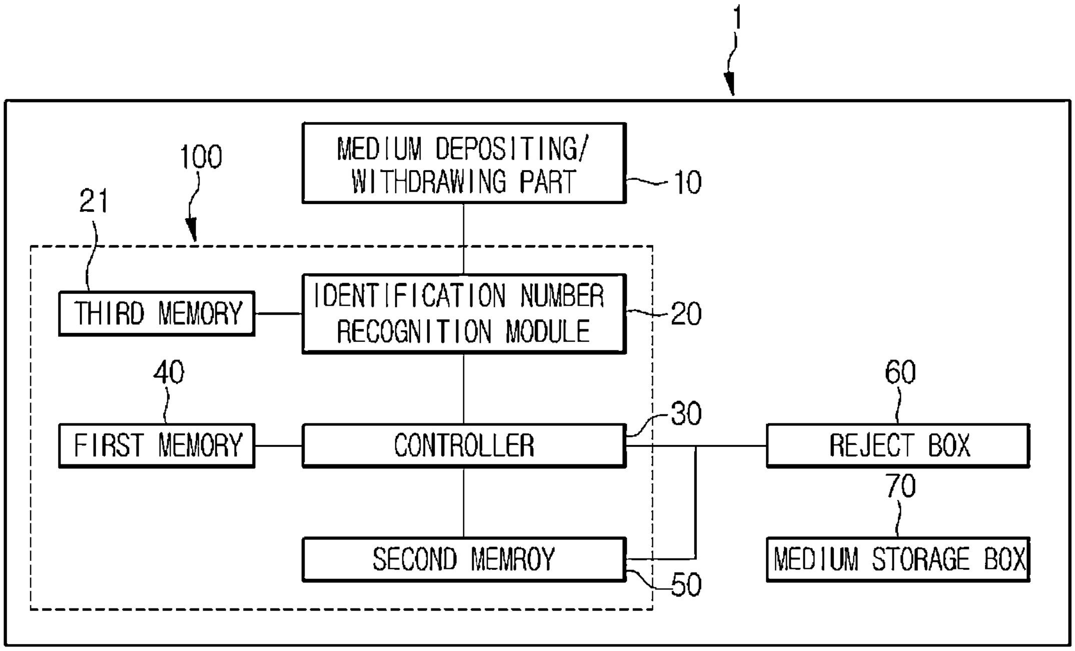
FIG. 1 is a block diagram illustrating internal components of a financial device according to an embodiment.

Hereinafter, exemplary embodiments of the present disclosure will be described with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

Also, in the description of embodiments, terms such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, the former may be directly "connected," "coupled," and "joined" to the latter or "connected", "coupled", and "joined" to the latter via another component.

A financial device according to embodiments is a device that performs financial businesses, i.e., medium processing comprising processing such as deposit processing, giro receipt, or gift certificate exchange and/or processing such as withdrawal processing, giro dispensing, or gift certificate dispensing by receiving various media such as, e.g., paper moneys, bills, giros, coins, gift certificates, etc. For example, the financial device may comprise an automatic teller machine (ATM) such as a cash dispenser (CD) or a cash recycling device. However, the financial device is not limited to the above-described examples. For example, the financial device may be a device for automatically performing the financial businesses such as a financial information system (FIS).

Hereinafter, assuming that the financial device is the ATM, an embodiment will be described. However, this assumption is merely for convenience of description, and technical idea of the present disclosure is not limited to the ATM.

FIG. 1 is a block diagram illustrating internal components of a financial device according to an embodiment.

Referring to FIG. 1, a financial device 1 according to an embodiment may comprise a medium depositing and withdrawing part 10 through which a medium is deposited or withdrawn, a medium handling apparatus 100 for determining whether the medium is the management target medium, a reject box 60 for storing the management target medium, and a medium storage box 70 in which a normal medium is stored. For example, the management target medium may comprise a forged medium.

The medium handling apparatus 100 may comprise an identification number recognition module 20, a controller 30, a first memory 40, and a second memory 50. The identification number recognition module 20 may comprise a third memory.

The identification number recognition module 20 may recognize an identification number of a medium deposited through the medium depositing and withdrawing part 10 or an identification number of a medium to be withdrawn from the medium storage box 70. For example, the identification number may be a serial number of the medium. Thus, the identification number recognition module 20 may be called a serial number recognition module.

If any identification number of media is duplicated in the transaction, the identification number recognition module 20 may transmit information with respect to the duplicated number to the controller 30. The information with respect to the duplicated identification number may be stored in the second memory 50.

For example, when a plurality of media are transacted in the financial device 1, information with respect to an identification number of a medium recognized by the identification number recognition module 20 among the plurality of media may be temporally stored in the third memory 21. Thereafter, if the identification number of the medium recognized by the identification number recognition module 20 and the identification number temporally stored in the third memory 21 are duplicated, the controller 30 may determine the medium having the duplicated identification number as a management target medium. Here, the information with respect to the duplicated identification number may be transmitted and stored into the second memory 50. That is to say, the identification number of the transacting medium recognized by the identification number recognition module 20 is accumulatively stored in the third memory 21. Then, the controller 30 determines whether the identification number of the recognized medium is equal to that of the medium accumulatively stored in the third memory 21. If it is determined that the identification number of the media are the same, the controller 30 transmits the identification number of the same medium into the second memory 50.

When the transaction of the medium is finished, the information with respect to the identification number temporally stored in the third memory 21 may be deleted. If it is determined that the medium having the duplicated identification number exists, the information with respect to the duplicated identification number may be stored in the second memory 50, and then, the information with respect to the identification number temporally stored in the third memory 21 may be deleted.

As described above, a condition in which the identification number of the medium recognized by the identification number recognition module 20 is duplicated with the identification number temporally stored in the third memory 21 may be referred to as a second condition in which the medium is determined as a management target medium. When at least two media having the duplicated identification number in the plurality of transacting media exist, the media having the duplicated identification number may satisfy the second condition and thus be deal with the management target medium.

A first condition in which a medium is determined as the management target medium may be previously stored. For example, a specific number, an arrangement of characters, a symbol having a specific shape, and the like in which possibility to be determined as the management target medium is high may be stored in the first memory 40.

The controller 30 determines whether the transacting medium satisfies the first or second condition. If it is determined that the medium satisfies the first or second condition, the medium may move into the reject box 60 or return to the medium depositing and withdrawing part 10.

All of information with respect to management target media handled in the financial device 1 may be stored in the second memory 50. That is, information with respect to management target media handled in the financial device 1 may be accumulatively stored in the second memory 50.

For example, the information with respect to the management target media accumulatively stored in the second memory 50 may represent information with respect to an identification number of a medium satisfying the first or second condition. A condition in which the information with respect to the identification numbers of the management target media accumulatively stored in the second memory 50 accords with the information with respect to the identification number of the medium may be referred to as a third condition.

The controller 30 may determine whether a medium is the management target medium with respect to a medium deposited from the medium depositing and withdrawing part 10 as well as a medium withdrawn from the medium storage box 70. The controller 30 transfer the medium that is determined as the management target medium into the reject box 60.

Hereinafter, in a case where a medium is deposited into the financial device according to an embodiment, a method for handling the medium will be described.

Figure 2:
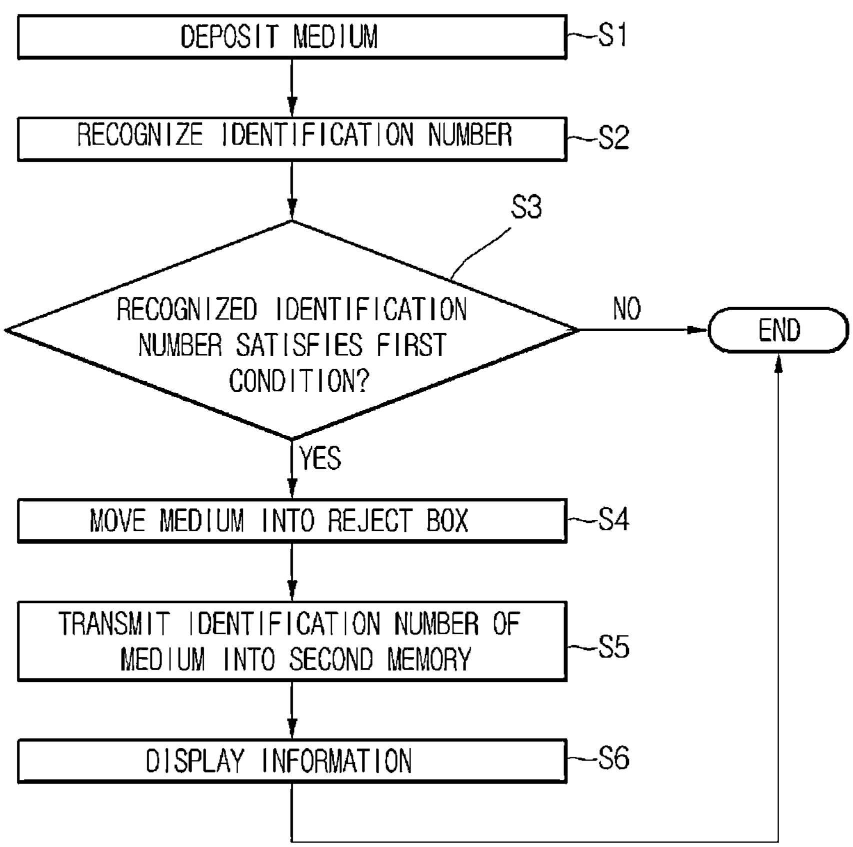
FIG. 2 is a flowchart of a medium handling method according to a first embodiment.

FIG. 2 is a flowchart of a medium handling method according to a first embodiment.

Referring to FIG. 2, a medium handling method according to a first embodiment comprises, when a medium is deposited (S1), a process of moving the medium into a medium handling apparatus 100 to recognize an identification number of the deposited medium by using an identification number recognition module 20 (S2). When the identification number of the medium is recognized, a controller 30 determines whether the recognized identification number satisfies a first condition (S3). That is, it is determined whether the recognized identification number comprises arrangement of figures, characters, and symbols which are used to be determined as the management target medium stored in a first memory 40.

If the recognized identification number does not satisfy the first condition, the transaction of the medium is continuously maintained. If the recognized identification number satisfies the first condition, the controller 30 moves the medium satisfying the first condition into a reject box (S4). Then, identification number information with respect to the medium satisfying the first condition is transmitted into a second memory (S5). Here, information in which the medium satisfying the first condition is moved into the reject box may be displayed on a display unit, be transmitted into an informing device to display the information, or be transmitted into a separate recording medium to record the information (S6).

Figure 3:
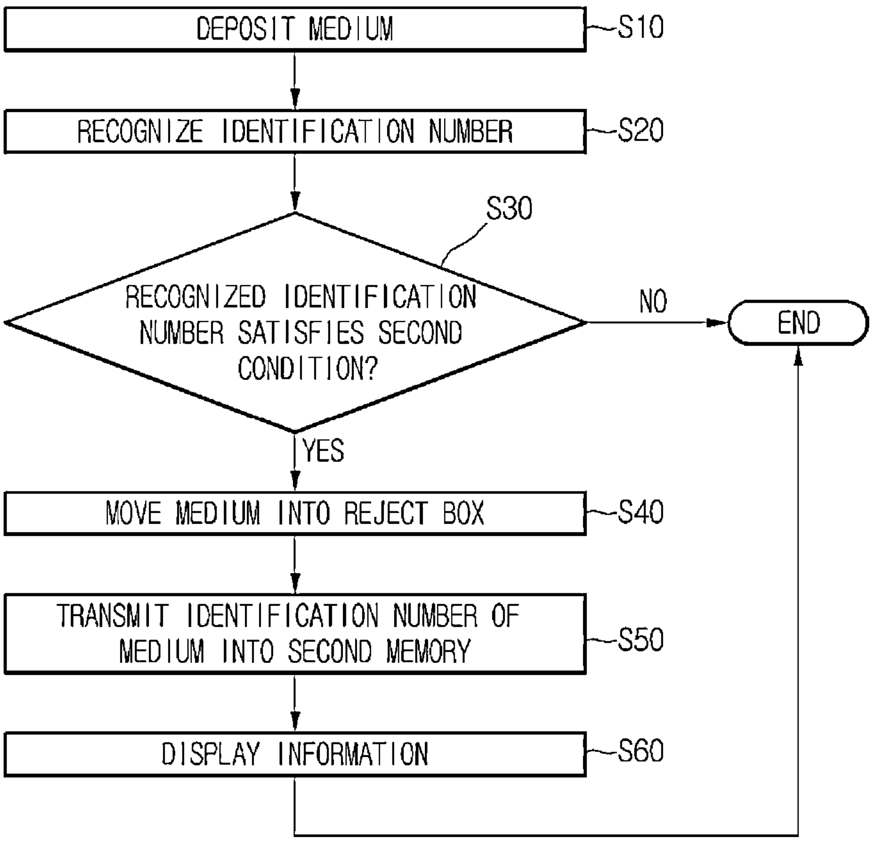
FIG. 3 is a flowchart of a medium handling method according to a second embodiment.

FIG. 3 is a flowchart of a medium handing method according to a second embodiment.

Referring to FIG. 3, a medium handling method according to a second embodiment comprises, when a medium is deposited (S10), a process of moving the medium into a medium handling apparatus 100 to recognize an identification number of the deposited medium by using an identification number recognition module 20 (S20). When the identification number of the medium is recognized, a controller 30 determines whether the recognized identification number satisfies a second condition (S30). That is, it is recognized that at least two media of a plurality of deposited media have a duplicated identification number, it is determined that the media satisfy the second condition.

If the media do not satisfy the second condition, the transaction of the medium is continuously maintained. If the recognized identification number satisfies the second condition, the controller 30 moves the media having the duplicated identification number into a reject box (S40). Then, information with respect to the duplicated identification number is transmitted into a second memory (S50). Here, information in which the media satisfying the second condition are discovered and moved into the reject box may be displayed on a display unit, be transmitted into an informing device to display the information, or be transmitted into an extra recording medium to record the information (S60).

Although a case in which the medium is deposited is described as an example in the first and second embodiments, the present disclosure is not limited thereto. For example, a case in which the medium is withdrawn may be applied to the medium handling method according to the foregoing embodiments. When the medium is withdrawn, the processes S1 and S10 in which the medium is deposited may be omitted. Also, a process in which the medium stored in the medium storage box is withdrawn may be additionally performed. The withdrawn medium may be moved into the medium handling apparatus 100. Thereafter, the medium handling method may apply the medium handling methods according to the first and second embodiments.

Figure 4:
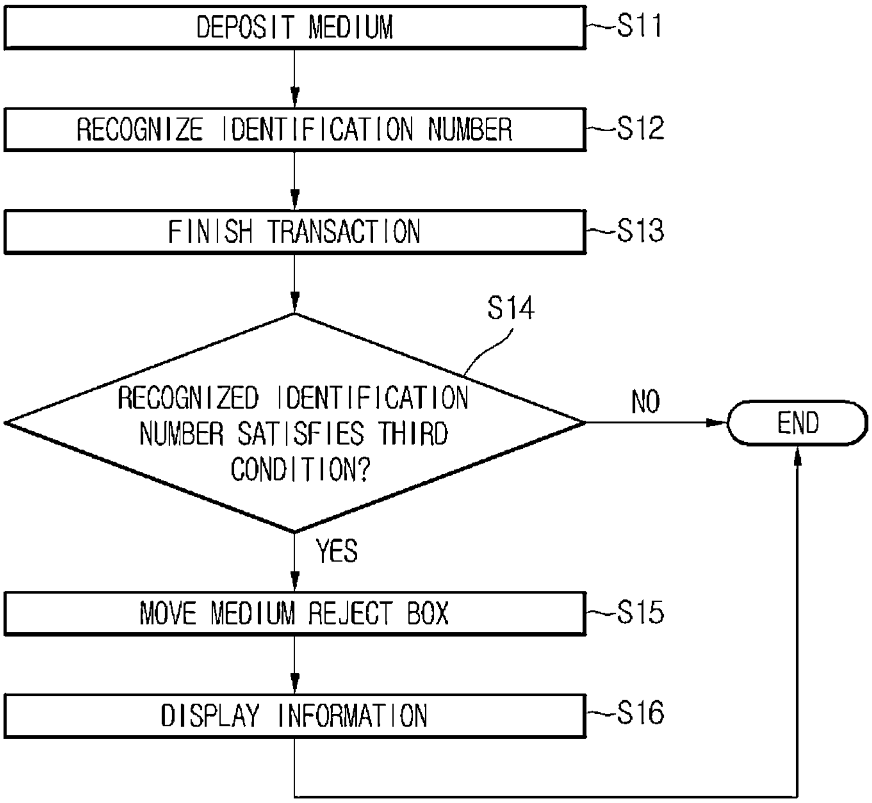
FIG. 4 is a flowchart of a medium handling method according to a third embodiment.

FIG. 4 is a flowchart of a medium handing method according to a third embodiment.

Referring to FIG. 4, a medium handling method according to a third embodiment comprises, when a medium is deposited (S11), a process of moving the medium into a medium handling apparatus 100 to recognize an identification number of the medium by using an identification number recognition module 20 (S12). When the transaction is finished (S13), the controller determines whether the recognized identification number satisfies a third condition (S14). That is, it is determined whether the recognized identification number accords with information with respect to a management target medium stored in the second memory.

If the recognized identification number does not satisfy the third condition, the method handling method is ended. If the recognized identification number satisfies the third condition, the controller 30 moves the deposited medium into the reject box (S15). Here, information in which the medium satisfying the third condition is moved into the reject box may be displayed on a display unit, be transmitted into an informing device to display the information, or be transmitted into a separate recording medium to record the information (S16).

Also, if the recognized identification number satisfies the third condition, information in which a medium satisfying the third condition exists may be displayed on the display unit or transmitted into other informing devices to stop the transaction using the corresponding financial device. Also, before the third condition is determined, the media are stored in a temporary storage box. Then, it is determined whether the media satisfy the third condition in the temporary storage box. If a medium satisfying the third condition is discovered, the medium is moved into a reject box. On the other hand, if the transacted media do not satisfy the third condition, the media are moved into the medium storage box 70.

In the medium handling method according to the first and second embodiments, when the financial transactions are ongoing, an identification number of the transacting medium and information with respect to an identification number of the previously stored management target medium may be compared to each other to determine management target media in real-time.

In the medium handling method according to the third embodiment, when the deposition transaction of the medium is finished by the financial device, an identification number of the deposited medium and information with respect to an identification number of a medium that is determined as the management target medium in the past are compared to each other to determine whether the deposited medium is the management target medium.

Figure 5:
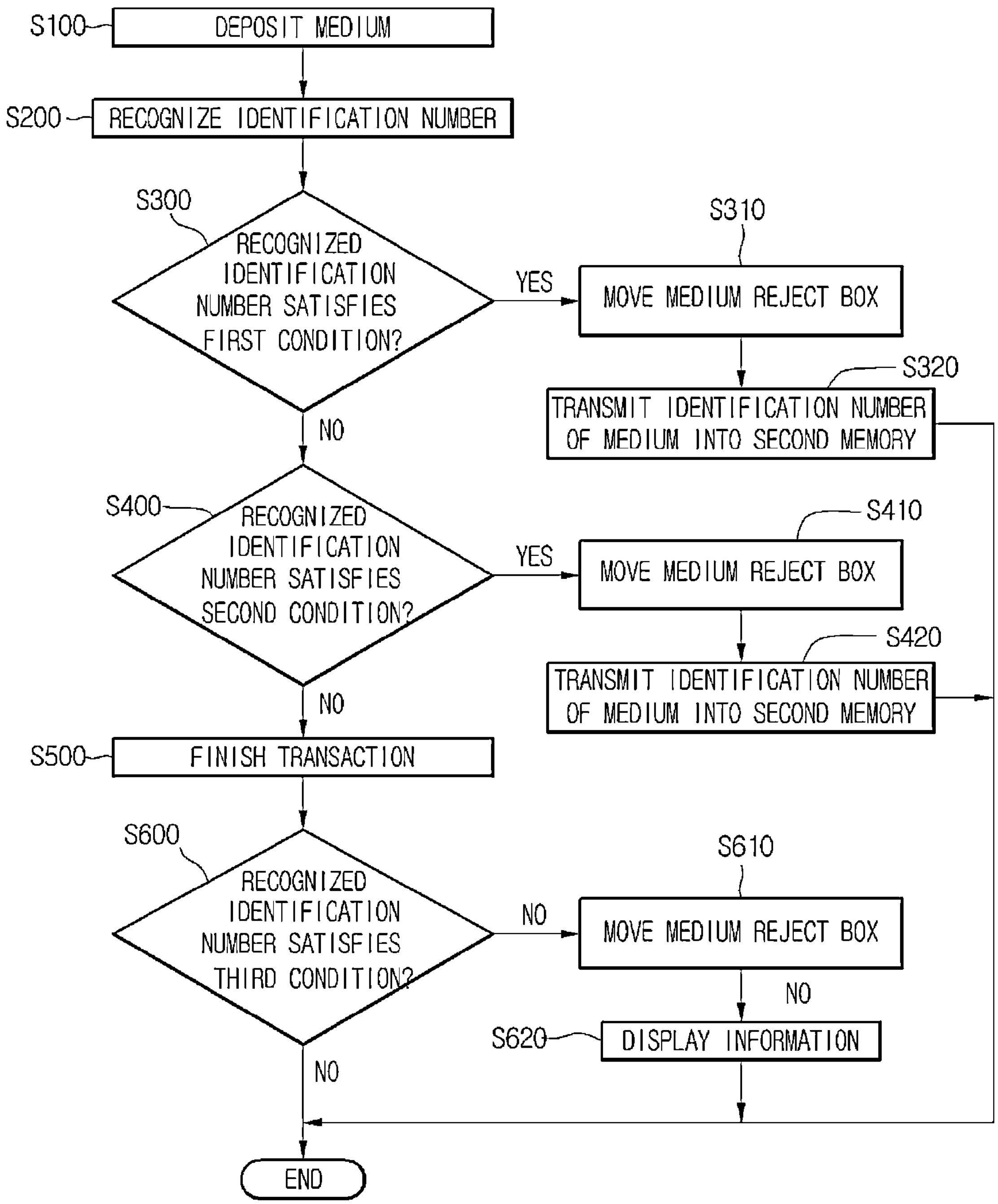
FIG. 5 is a flowchart of a medium handling method according to a fourth embodiment.

FIG. 5 is a flowchart of a medium handing method according to a fourth embodiment.

Referring to FIG. 5, a medium handling method according to a fourth embodiment comprises, when a medium is deposited (S100), a process of moving the deposited medium into a medium handling apparatus 100 to recognize an identification number of the deposited medium by using an identification number recognition module 20 (S200). When the identification number of the deposited medium is recognized, a controller 30 determines whether the recognized identification number of the medium satisfies a first condition (S300).

If the recognized identification number of the medium satisfies the first condition, the controller 30 moves the medium into a reject box (S310). Also, information with respect to the identification number of the medium is transmitted into a second memory (S320). Then, information for informing the movement of the medium satisfying the first condition into the reject box 60 may be displayed on a display or other informing devices or recorded in other recording devices (S620).

When the identification number of the medium does not satisfy the first condition, it is determined whether the recognized identification number of the medium satisfies a second condition (S400). If it is determined that the identification number of the medium satisfies the second condition, the controller 30 moves the medium into a reject box (S410). Also, information with respect to the identification number of the medium is transmitted into the second memory (S420). Then, information for informing the movement of the medium satisfying the second condition into the reject box 60 may be displayed on a display or other informing devices or recorded in other recording devices (S620).

If the recognized identification number does not satisfy the second condition, the deposition transaction of the medium is finished (S500). When the transaction is finished, the controller determines whether the identification number satisfies a third condition (S600).

Also, if the recognized identification number of the medium satisfies the third condition, the medium is moved into the reject box (S610). Then, information for informing the movement of the medium satisfying the third condition into the reject box may be displayed on a display or other informing devices or recorded in other recording devices (S620). If the recognized identification number of the medium does not satisfy the third condition, the method handling method is ended.

If the recognized identification number satisfies the third condition, information in which a medium satisfying the third condition exists may be displayed on the display unit or transmitted into other informing devices to stop the transaction using the corresponding financial device. Also, before the third condition is determined, the media are stored in a temporary storage box. Then, it is determined whether the media satisfy the third condition in the temporary storage box. If a medium satisfying the third condition is discovered, the medium is moved into a reject box. On the other hand, if the traded media do not satisfy the third condition, the media are moved into the medium storage box 70.

Thus, whether the medium is the management target medium may be determined during the financial transactions in real-time by the financial device. Also, after the financial transactions are finished, whether the medium is the management target medium may be determined by using the information with respect to the identification number that is determined as the management target medium in the past to effectively distinguish the management target medium used in the financial transactions using the financial device.

Even though all the elements of the embodiments are coupled into one or operated in the combined state, the present disclosure is not limited to such an embodiment. That is, all the elements may be selectively combined with each other without departing the scope of the invention. Furthermore, when it is described that one comprises (or comprises or has) some elements, it should be understood that it may comprise (or comprise or has) only those elements, or it may comprise (or comprise or have) other elements as well as those elements if there is no specific limitation. Unless otherwise specifically defined herein, all terms comprising technical or scientific terms are to be given meanings understood by those skilled in the art. Like terms defined in dictionaries, generally used terms needs to be construed as meaning used in technical contexts and are not construed as ideal or excessively formal meanings unless otherwise clearly defined herein.

Every one of the components may be also implemented by itself in hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in the computer readable media, which in operation can realize the embodiments of the present disclosure. Examples of the computer readable media are magnetic recording media, optical recording media, and carrier wave media and more.

Although embodiments have been described with reference to a number of illustrative embodiments thereof, it will be understood by those skilled in the art that various changes in form and details may be made therein without departing from the spirit and scope of the invention as defined by the appended claims. Therefore, the preferred embodiments should be considered in descriptive sense only and not for purposes of limitation, and also the technical scope of the invention is not limited to the embodiments. Furthermore, is defined not by the detailed description of the invention but by the appended claims, and all differences within the scope will be construed as being comprised in the present disclosure.

What is claimed is:

1. A medium handling apparatus comprising:

an identification number recognition module to recognize an identification number of a medium;

a memory in which a condition with respect to a management target medium is stored; and a controller determining whether the medium is the management target medium by determining whether the identification number of the medium recognized by the identification number recognition module satisfies the condition with respect to the management target medium stored in the memory, wherein the medium recognized by the identification number recognition module is at least one of paper money and check, and wherein the memory comprises:

a first memory in which a first condition with respect to the management target medium is stored; and a second memory in which a second condition with respect to the management target medium is accumulatively stored;

wherein the identification number recognition module comprises a third memory into which a recognized identification number of a first medium is temporarily stored, wherein if the controller determines that an identification number of a second medium recognized by the identification number recognition module and the identification number of the first medium stored into the third memory are duplicated, then the second medium having the duplicated identification number as the management target medium and information with respect to the duplicated identification number is stored into the second memory, and then information with respect to the identification number of the first medium temporarily stored in the third memory is deleted after a transaction of the medium handling apparatus is finished.

2. The medium handling apparatus of claim 1, wherein the controller determines whether the medium is the management target medium during or after financial transaction of the medium.

3. The medium handling apparatus of claim 1, further comprising an informing device to inform that the medium is the management target medium when it is determined that the medium is the management target medium.

4. The medium handling apparatus of claim 1, wherein, when the identification number of the medium recognized by the identification number recognition module satisfies the first condition after financial transaction is finished, the controller determines the medium as the management target medium.

5. The medium handling apparatus of claim 1, wherein, when the identification number of the medium recognized by the identification number recognition module is duplicated with an identification number temporarily stored in the third memory, the identification number recognition module transmits information with respect to the duplicated identification number to the controller.

6. The medium handling apparatus of claim 1, wherein, when the medium satisfies the second condition after the financial transaction of the medium is finished, the controller determines the medium as the management target medium.

7. The medium handling apparatus of claim 1, wherein the first condition comprises a condition in which information with respect to the identification number of the medium recognized by the identification number recognition module accords with information with respect to the identification number of the management target medium stored in the first memory.

8. The medium handling apparatus of claim 1, wherein the second condition comprises a condition in which information with respect to the identification number of the medium recognized by the identification number recognition module accords with information with respect to the identification number of the management target medium stored in the second memory.

9. The medium handling apparatus of claim 1, wherein the management target medium comprises a forged medium.

10. The medium handling apparatus of claim 1, wherein the controller controls a transfer of the medium, and the medium is transferred to a reject box when the controller determines that the medium is the management target medium.

* * * * *